I. S. WILSON.
COMBINED STACK AND FEED-CUTTER.
No. 172,814. Patented Jan. 25, 1876.
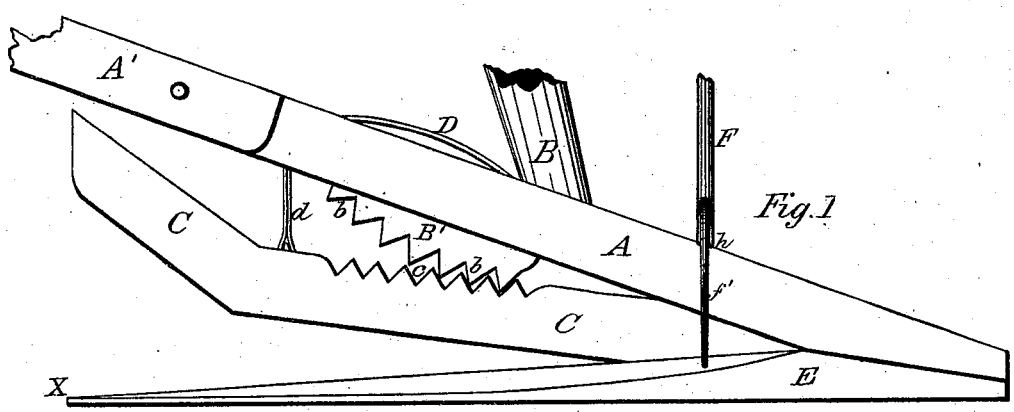
Fig. 1
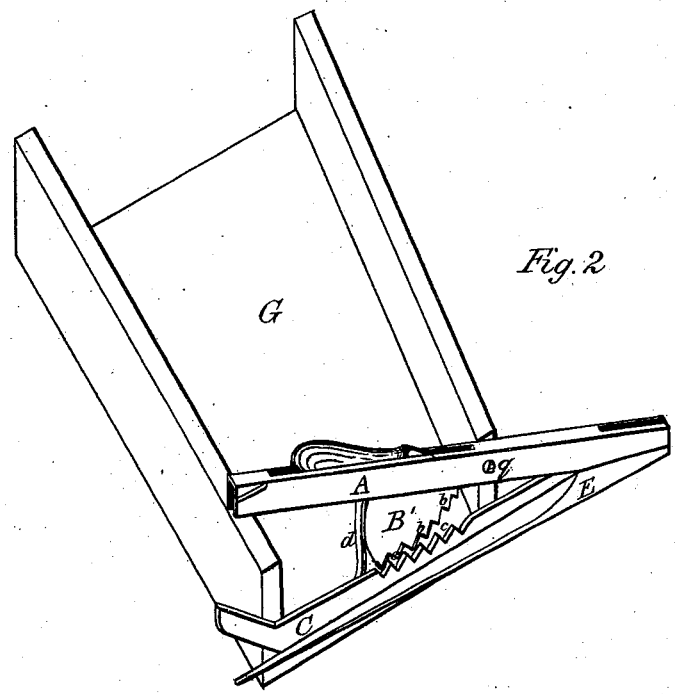
Fig. 2
Fig. 3
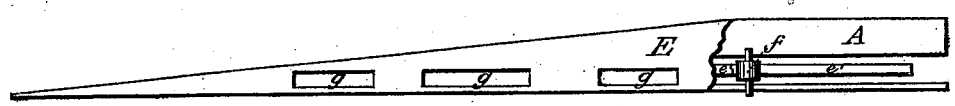
Attest:
Wm Bagger
C. A. Snow.
Inventor:
Isaac S. Wilson,
by Louis Bagger
his Atty.

UNITED STATES PATENT OFFICE.

ISAAC S. WILSON, OF WALDO, MISSOURI.

IMPROVEMENT IN COMBINED STACK AND FEED CUTTERS.

Specification forming part of Letters Patent No. 172,814, dated January 25, 1876; application filed August 19, 1875.

*To all whom it may concern:*

Be it known that I, ISAAC S. WILSON, of Waldo, in the county of Webster and State of Missouri, have invented certain new and useful Improvements in Combined Stack and Feed Cutters; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 1 is a side elevation of my improved stack-cutter. Fig. 2 is a perspective view of the same used as a feed-cutter, and attached to the cutting-box; and Fig. 3 is a bottom view of the cutter, partly in section.

Similar letters of reference indicate corresponding parts in all the figures.

This invention consists in the construction and arrangement of parts of a stack-cutter in such a manner that it may be used as a feed-cutter also, so that one implement shall serve the double purpose of cutting the stack in the field, preparatory to removing a portion of the hay or straw, and afterward comminute the hay or straw thus cut off for feed.

In the drawing, A represents the frame or handle, which consists of the slotted part A and the adjustable handle A'. Within the slot in A is pivoted the bent lever B, which has, on the under side B', a series of teeth or notches, b, forming a segmental rack, that engages with a series of corresponding notches, c, in the back of the knife C. The latter is affixed, by a thin rod or wire, d, to the spring D, which is firmly secured in the bend of the lever B.

The other end of the knife C forms two arms or projections, e e', that slide upon a pulley, f, within the frame A, as shown.

The cutting-edge of the knife or cutter C engages with and works against the pointed tongue E, which is firmly secured to the frame A at the point or termination of the latter, and has a longitudinal groove in its upper side, which receives the edge of the knife.

If this groove should become choked up with particles of hay or straw it may be cleaned by inserting a knife or other pointed instrument through the perforations g in the under side of tongue E.

The operation of my improved stack-cutter, as such, will be readily understood from the foregoing description.

The knife being lifted by raising the handle A', the point X of tongue E is inserted into the stack at any convenient point, and by operating the lever B this is readily cut through, the cutter being worked slowly through the stack from one side to the other, or from top to bottom, as the case may be.

It may sometimes be found desirable, when the stack consists of tightly-packed hay or straw, to employ the anchors F, (shown in Fig. 1,) which consist each of a lever or handle pivoted to the frame A at h, and having pointed hooks f', that are forced into the hay under the cutter C, the tongue E having been previously detached from frame A, so that the straw to be cut is grasped between the hooks f' and the cutter C.

When it is desired to use this device as a feed-cutter it is secured onto the end of the feed-box G by screws or bolts g, as shown in Fig. 2, in such a manner that the knife C, when operated by the lever B, will cut transversely through the feed contained in the box as it is moved along. When used in this capacity I prefer to detach the long handle A'.

Having thus described my invention, I claim and desire to secure by Letters Patent of the United States—

1. The combined stack-cutter herein shown and described, consisting of the handle A', frame A, tongue E, knife C, bent lever B B', rod d, and spring D, all combined and operating substantially as and for the purpose hereinbefore set forth.

2. In combination with the frame A, bent lever B B', and cutter C, the anchors F, pivoted to A, and having hooks or catches f', substantially as and for the purpose herein set forth.

3. The combination of my improved stack-cutter, herein described, with a feed or cutting box, G, so as to be used as a feed-cutter, substantially as and for the purposes herein set forth and specified.

In testimony that I claim the foregoing as my own I have affixed my signature in presence of two witnesses.

ISAAC S. WILSON.

Witnesses:
J. HEY FOSTER,
B. R. BREWER.